UNITED STATES PATENT OFFICE 2,031,621

CONCRETE AND HYDRAULIC CEMENT

George R. Tucker, deceased, late of North Andover, Mass., by Charles W. Tucker, administrator, North Andover, Mass., and Henry L. Kennedy, Arlington, and Maynard S. Renner, Cambridge, Mass., assignors to Dewey and Almy Chemical Company, North Cambridge, Mass., a corporation of Massachusetts No Drawing. Application December 5, 1934, Serial No. 756,082

17 Claims. (Cl. 106—27)

This invention relates to concrete and the hydraulic cement from which it is prepared, and comprises the introduction into the concrete or cement of a small quantity of a hydroxy-alkyl amine or a salt or derivative thereof, all as more fully hereinafter described and claimed.

An object of the invention is to increase the compressive strength of hardened concrete beyond that which can be obtained from any given mixture of hydraulic (e. g. ordinary Portland) cement, aggregates, and water. Another object is to reduce the amount of hydraulic cement required under any fixed set of conditions to produce a unit volume of hardened concrete of assigned compressive strength, or conversely, to increase the volume of hardened concrete of specified strength which can be obtained under any given set of conditions from a unit weight of hydraulic cement. Yet another object is to provide a substance which when introduced into concrete in small quantity will improve the quality thereof. Still other objects and advantages of the invention will become apparent with its more detailed description.

We have discovered that the compressive strength of hardened concrete may be increased, or that the amount of hydraulic cement essential under any given set of conditions to produce a unit volume of hardened concrete of assigned strength may be reduced, by introducing into the concrete a suitable quantity of a water-soluble hydroxy-alkyl amine or a salt or derivative thereof. We have found that the ethanol amines possess special advantages and of the available compounds, triethanol amine is the most effective. The commercial product consisting largely of triethanol amine together with smaller quantities of the primary and secondary compounds, is much cheaper than the pure compound and is very satisfactory. We have found, however, that in place of triethanol amine we may effectively employ other hydroxy-alkyl amines, for example, diethanol amine or tri-isopropanol amine.

For the general purposes of this invention it makes no difference whether the hydroxy-alkyl amines are employed in the form of their free bases or in the form of salts. Moreover, when we use the general term hydroxy-alkyl amine, or a specific name of a member of this class, i. e. triethanol amine, we mean not only the pure chemical compound or one of its salts, but any chemical compound or combination which will give rise to the desired hydroxy-alkyl amine under the conditions of use of the same. Further, a salt of the hydroxy-alkyl amine as it is used in this application is to be construed as being either the salt of the hydroxy-alkyl amine with an inorganic acid, or with an organic acid. Thus, for some purposes we employ such salts as a hydroxy-alkyl ammonium chloride or the sulphate, while in other cases we have found it particularly advantageous to use salts of organic acids, as for example, a triethanol ammonium salt of the dispersing agent described by George R. Tucker in his application Serial No. 643,740, filed November 21, 1932. In this latter case the combination gives greater workability to the cement-concrete mix as well as an increase in strength in the hardened concrete. Inasmuch as the free amines are generally of fluid or viscous consistency, however, it is desirable to use the solid salts whenever it is wished to treat dry hydraulic cement in accordance herewith.

In general, we have found that one part of hydroxy-alkyl amine, or a quantity of salt which contains an amount of chemically combined amine equivalent to one part of the free amine, for every 2,000 to 14,000 parts of hydraulic cement constituent yields the best results. Much smaller quantities result in a sacrifice of some of the advantages of this invention; but much larger quantities, e. g. 25 times the minimum amount of any given amine required to yield the optimum effect in concrete may actually defeat the purposes of the invention and are therefore to be avoided.

As previously indicated, the hydroxy-alkyl amine may with substantially equivalent results either be mixed with the water, cement, and aggregates at the time the concrete is prepared or first admixed with the dry hydraulic cement before it is made into concrete. In the former case it is convenient to dissolve the required quantity of the compound in the gauging water. When the addition is made to the dry cement it is desirable to add the amine in the form of one of its solid salts. For this purpose it is convenient to premix the finely powdered salt with ground cement or other finely divided material, such as gypsum, in a master batch before admixing it with the bulk of the hydraulic cement. This facilitates and insures a uniform distribution of the relatively minute quantity of the active ingredient throughout the cement. The master batch may be added to the clinker before it enters the tube mill where thorough grinding and mixing occur, or it may be mixed into the finally ground cement before it is packaged.

Concrete prepared from fixed quantities of cement, water, and aggregates in accordance with the general process of this invention possesses, in the wet condition, practically the same consistency, i. e. slump, and workability, as exactly similar concrete which contains none of the herein described agents, but, in the hardened state, possesses a substantially higher compressive strength than the latter. The extent of the improvement in strength depends upon the cement and the mix employed as well as upon the particular amine or amine salt selected. Cement which has been ground to a somewhat superior degree of fineness is more responsive to the treatment than coarser material. The preferred amine, triethanol amine, generally affords a 15-25% improvement in the strength of concrete made from ordinary Portland cement to a 1:2:4 mix. It will be obvious to those skilled in the art that when it is desired to adhere to a given strength in the hardened concrete, this invention permits the use of a leaner mix with the consequent well known economies than would otherwise be possible.

This invention permits the preparation, from the more usual type of Portland cements, of high-early-strength cements which are equal or superior in strength to the commercial early-strength Portland cements which are generally prepared by a double calcination procedure. For this purpose the Portland cement clinker is ground in the presence of any of our agents to a superior degree of fineness, e. g. until only 10% is retained by a standard 325-mesh sieve; or the agent may be subsequently added to the properly ground cement. Early-strength cements prepared according to this general procedure are not only equal to commercial early-strength materials in compressive strength characteristics but possess the additional advantage that they evolve considerably less heat during the hardening or strength-producing process than the usual early-strength materials made by the double calcination procedure. This advantage leads to hardened concretes which are more durable; for the lesser evolution of heat gives greater freedom from cracks, due to cooling and consequent contraction of the finally hardened concrete, particularly where large masses are involved.

The process and product of this invention may be used with advantage together with the common concrete admixtures such as diatomaceous earth, which is employed to improve the consistency of concrete, and heavy metal stearates, oleates, etc., which are added to concrete to make it shed water. These materials in no way interfere with the advantageous function of the herein described agents: each ingredient performs its own advantageous function in the presence of the other.

What is claimed is:

1. That process for the preparation of concrete which includes mixing hydraulic cement, aggregates, and water in the presence of triethanol amine.

2. That process for the preparation of concrete which includes mixing hydraulic cement, aggregates, and water in the presence of diethanol amine.

3. That process for the preparation of concrete which includes mixing hydraulic cement, aggregates, and water in the presence of tri-isopropanol amine.

4. As a new composition of matter dry hydraulic cement and a salt of a hydroxy-alkyl amine in intimate admixture therewith.

5. As a new composition of matter, dry hydraulic cement and a salt of an ethanol amine in intimate admixture therewith.

6. As a new composition of matter, dry hydraulic cement and a salt of triethanol amine in intimate admixture therewith.

7. As a new composition of matter, dry hydraulic cement and a salt of tri-isopropanol amine in intimate admixture therewith.

8. As a new composition of matter, dry hydraulic cement and a hydroxy-alkyl amine in intimate admixture therewith.

9. As a new composition of matter, dry hydraulic cement and an ethanol amine in intimate admixture therewith.

10. As a new composition of matter, dry hydraulic cement and triethanol amine in intimate admixture therewith.

11. As a new composition of matter, hydraulic cement concrete containing tri-isopropanol amine and strengthened thereby.

12. As a new composition of matter, hydraulic cement concrete containing an ethanol amine and strengthened thereby.

13. As a new composition of matter, hydraulic cement concrete containing triethanol amine and strengthened thereby.

14. As a new composition of matter, hydraulic cement concrete containing tri-isopropanol amine and strengthened thereby.

15. As a new composition of matter, concrete which contains a salt of a hydroxy-alkyl amine.

16. That process for the preparation of concrete which comprises mixing hydraulic cement, aggregates and water in the presence of a hydroxy-alkyl amine.

17. That process for the preparation of concrete which comprises mixing hydraulic cement, aggregates, and water in the presence of a salt of an ethanol amine.

CHARLES W. TUCKER,
*Administrator of the Estate of George R. Tucker, Deceased.*
HENRY L. KENNEDY.
MAYNARD S. RENNER.